United States Patent [19]

Boose et al.

[11] 3,723,693
[45] Mar. 27, 1973

[54] FINTUBE WELDING APPARATUS

[75] Inventors: Robert Carl Boose; Henry Weaver, both of Pryor; Harry Moore, Claremore, all of Okla.

[73] Assignee: Escoa Fintube Corporation, Pryor, Okla.

[22] Filed: Sept. 13, 1971

[21] Appl. No.: 179,798

[52] U.S. Cl. ................................. 219/62, 219/107
[51] Int. Cl. ............................................ B23k 11/08
[58] Field of Search ............ 219/62, 107, 59, 67, 102

[56] References Cited

UNITED STATES PATENTS

| | | | |
|---|---|---|---|
| 3,053,971 | 9/1962 | Busse | 219/107 |
| 3,578,165 | 5/1971 | Boose et al. | 219/62 X |
| 3,621,178 | 11/1971 | Nakayama | 219/62 X |

Primary Examiner—J. V. Truhe
Assistant Examiner—L. A. Schutzman
Attorney—Jackson & Jones

[57] ABSTRACT

An apparatus for mounting and welding fin stock to a tube is disclosed. The apparatus comprises a weld wheel rotatably mounted adjacent to a length of tubing at the point where a length of fin stock is fed onto the peripheral surface of the tubing. The weld wheel comprises a plurality of discs having annular portions spaced therebetween, the space between the discs forming annular pockets for receiving one or more of the fin portions as they are being fed onto the tubing. The sides of the discs extend substantially to the base of the fin stock to engage and adequately support the sides of the fin portions during such feeding. A first electrode is provided to contact the tubing surface, and a second electrode is provided to contact a portion of the weld wheel. The tubing, fin stock, and weld wheel are in continuous metal-to-metal engagement to establish an electrical current path between the two electrodes. A high frequency current is applied through the current path to melt the root of the fin stock and the surface of the tubing immediately prior to their mutual engagement point. As the fin stock and the tubing are drawn together, the annular portions function to apply a forging force to the fin stock to create a fused bond between the fin stock root and the tubing. Because of the lateral support provided by the weld wheel pockets, the wiggling at the base of the fin stock is minimized, thereby creating a stronger weld connection with the tubing.

11 Claims, 5 Drawing Figures

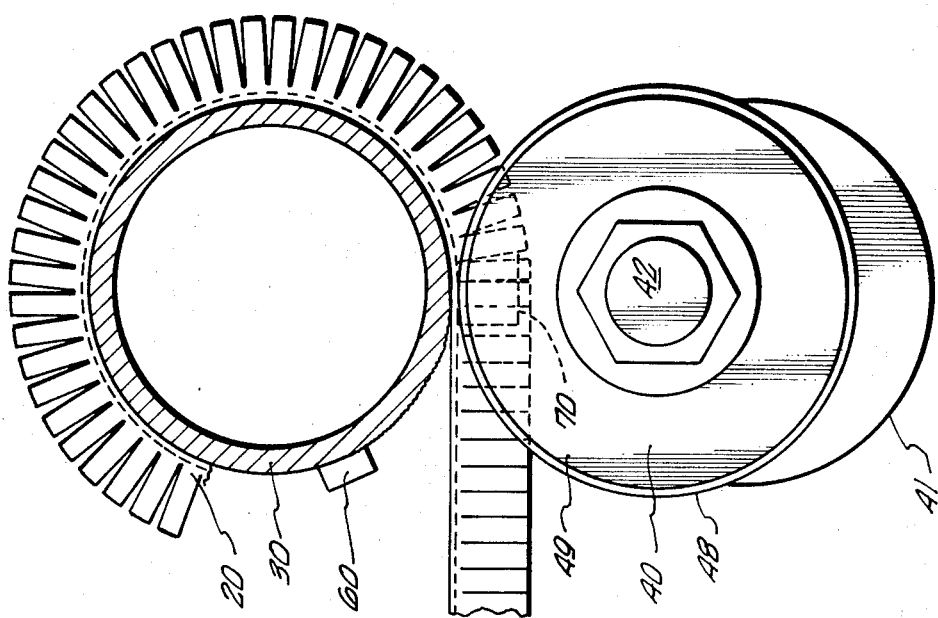
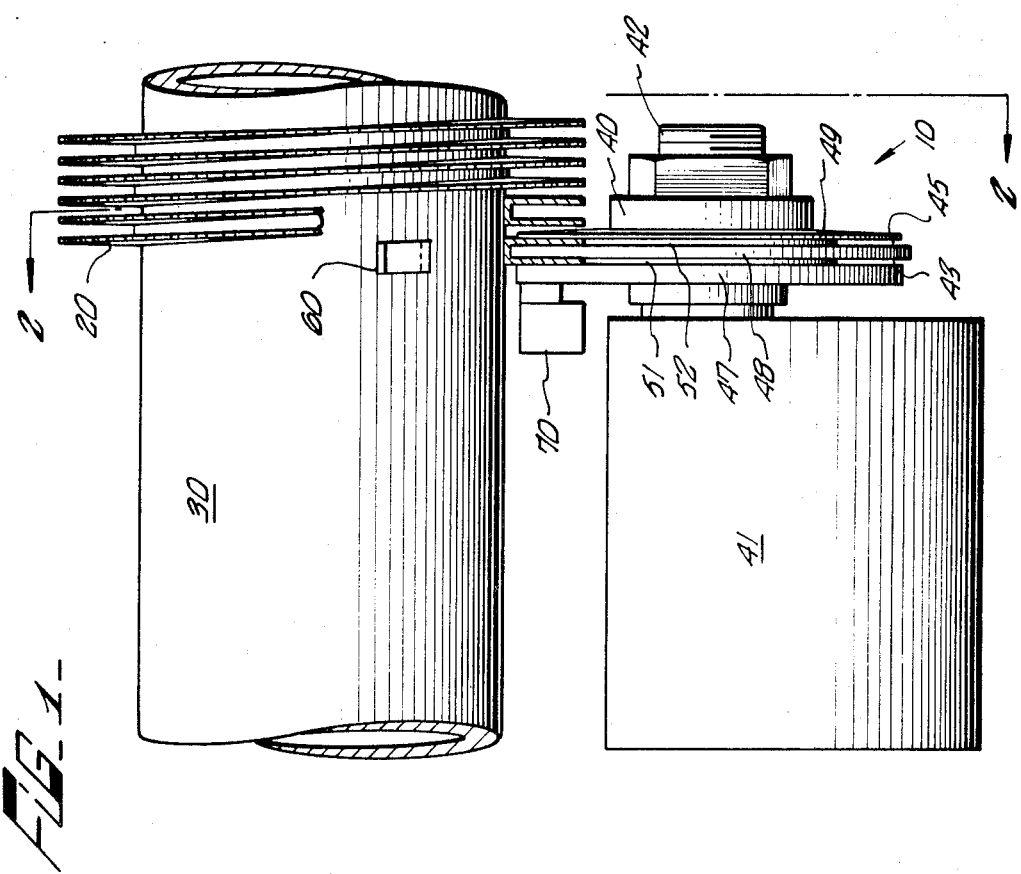

FINTUBE WELDING APPARATUS

BACKGROUND OF THE INVENTION

1. Field of the Invention

The present invention relates to finned tube heat exchangers and more particularly to methods for manufacturing such heat exchangers.

2. Description of the Prior Art

It has long been customary to attach fins made of metal to the exterior of tubing used in heat exchanger bundles to increase the effective area for heat transfer between a fluid flowing through the interior of the tubing and, in most cases, a liquid or gas across the outside thereof.

The types of fins utilized for attachment to the tubing are normally classified in three groups; the flanged fin, the channel fin, and the I-type fin. The flanged fin type comprises a major fin portion extending radially from the tubing and a bottom flanged base oriented perpendicular to the fin portion with the base adapted to be wrapped and attached around the outer surface of the tubing. The channel fin type comprises a continuous base having a pair of fin portions extending radially upwardly therefrom to form a U-shaped configuration. The I-type fin comprises a flat fin portion having its lower edge forming the base for attachment to the tubing.

The major fin portion of each of these various fins can be of the continuous or segmented type. The continuous fins normally have a smooth continuous surface, although they can be perforated to meet certain design conditions. The segmented fins comprise a plurality of blades formed from a continuous fin by cutting a plurality of slits downwardly from the top of the fin. The segmented fins are either oriented parallel to the root portion of the fin or are twisted at an angle thereto in any desired orientation in order to promote turbulence and increase the heat transfer rates.

These fins may be engaged to the tube in a helical or longitudinal configuration with the method of securing the fins to the tubing usually accomplished by some type of welding, brazing, or tension winding.

Although many types of welding methods have been utilized in attaching fins to tubing, a method that has been used extensively is the high frequency welding process. This process utilizes a forging or pressure wheel rotatably mounted adjacent to a length of rotatable tubing. A length of fin stock is helically fed onto the rotating tubing and is biased against the tubing by the forging or pressure wheel near the point of mutual engagement of the fin with the tubing. A pair of silver electrodes are provided for engaging the base of the fin and the surface of the tubing respectively just prior to the above-mentioned mutual engagement point. The electrodes, fin stock and tubing are in continuous engagement to provide an electrical current path therethrough. A high frequency current is applied through the path to cause the root of the fin and the tubing surface to melt. The force of the forging or pressure wheel against the fin causes the root of the fin to fuse against the tubing surface. Since space must be provided for enabling the electrode to contact the fin, the pressure wheel could only contact the top of the fin. For this reason, a ceramic guide is provided to bear against the side of the fin as it is fed onto the tubing to give the fin lateral support.

A major advantage of this process is that the speed of producing finned tubing is greatly increased.

However, the process includes various shortcomings which severely limit its utilization.

One problem with such a system is that for efficient operation, the resistance along the current path must be kept at a minimum. Because of this, the silver electrode has to be positioned to contact the fin stock as closely as possible to the point where it engages the tubing surface. As stated previously, this space is provided by extending the pressure wheel only to the tip of the fin stock or just slightly below, leaving one side of he fin stock unsupported except by the ceramic.

However, it has been found that firm lateral support is required for the fin stock as it is being wound onto the tubing surface. This is because of the fact that as the fin stock is bent around the tubing, the base of the fin is compressed while the tip of the fin is stretched. These compressive forces tend to cause the base of the fin to crimp or wiggle during such bending. This wiggling movement is detrimental to the creation of the weld. Utilizing a ceramic guide helps to give some lateral support. However, this support is not completely satisfactory to minimize the crimping and the weld that is created is inferior for many requirements.

Another problem involved is the high expense of the silver contacts. Not only is the initial cost of silver contacts high, but these contacts have a relatively high rate of wear and must be replaced at relatively short time intervals. Moreover, because of the fin wiggling movement, other cheaper metals cannot be used because of the high conductivity needed to ensure a proper flow of current between the fin and the electrode.

Another problem with the process is that the ceramic guides must be replaced frequently. This, of course, results in an additional amount of down time for the machine.

SUMMARY OF THE INVENTION

The present invention obviates the above-mentioned shortcomings by providing an apparatus for mounting and welding fin stock onto a tube, with the operation thereof being more efficient and economical and the fintube produced therefrom having a superior bond therebetween.

The apparatus comprises a rotatable weld wheel mounted adjacent to a length of tubing. The weld wheel includes an annular pocket for receiving the fin stock and laterally supporting the sides thereof as it is being fed onto the tubing. A pair of electrodes are provided, the first electrode contacting the tubing surface while the second electrode contacts a portion of the weld wheel. The first electrode, tubing surface, fin stock, weld wheel, and second electrode are in continuous engagement for providing an electrical current path therebetween. A high frequency current is applied through the path to melt the root of the fin stock and the surface of the tubing immediately prior to their mutual engagement point. The weld wheel further includes an annular surface that is adapted to contact the fin stock for applying a forging force thereto to create a fused bond therebetween.

A primary advantage of the present invention is that the electrode contacts the weld wheel instead of the fin stock. Since the rotation of the weld wheel is more stable than the movement of fin stock, the sliding engagement between the electrode and the weld wheel is greater and more continuous than the contact between an electrode and a fin. This enables the electrode to be made of a material having less conductivity than silver. The preferred embodiment utilizes a copper electrode. The advantage of utilizing a copper electrode instead of a silver electrode is threefold. Firstly, the initial cost of a silver electrode is much more than a copper electrode. Secondly, the copper electrode lasts much longer than a silver electrode. As a result, the replacement costs are greatly reduced. Thirdly, the added down time for replacing the silver electrode and the expense involved therewith is much greater than if copper electrodes were utilized.

Another advantage of the present invention is that because the weld wheel extends substantially to the base of the fin on both sides thereof the weld wheel provides all the guidance for the fin. Moreover, such guidance gives better lateral support to the fins than heretofore possible to minimize the wiggle at the base of the fin. This produces a better weld between the fin and the tubing surface. In fact, in a test conducted by the Navy at the Puget Sound Naval Shipyard, the fin-tube sample tested, which was made in accordance with the present invention, showed no deterioration on the bond between the fin and the tubing. Their conclusion was that the fin attachment method was recommended for their installations.

A further advantage of the present invention is that the lateral support provided by the weld wheel eliminates any requirement for ceramic guides or similar lateral support means. This makes the operation much simpler and more easily adaptable to various types of fintube configurations. Moreover, by eliminating ceramic guides in the manufacturing process, the amount of down time for replacing such guides is eliminated.

As a result, the present invention provides a less complex system for producing fintube of higher quality at a lower cost.

The features of the present invention which are believed to be novel are set forth with particularity in the appended claims. The present invention, both as to its organization and manner of operation, together with further objects and advantages thereof, may best be understood by reference to the following description, taken in connection with the accompanying drawings.

BRIEF DESCRIPTION OF THE DRAWINGS:

FIG. 1 is a plan view of an apparatus mounting and welding a segmented channel fin to a tube;

FIG. 2 is an elevational view, partly in section, of the apparatus of the present invention taken along lines 2—2 of FIG. 1;

Figure 5:
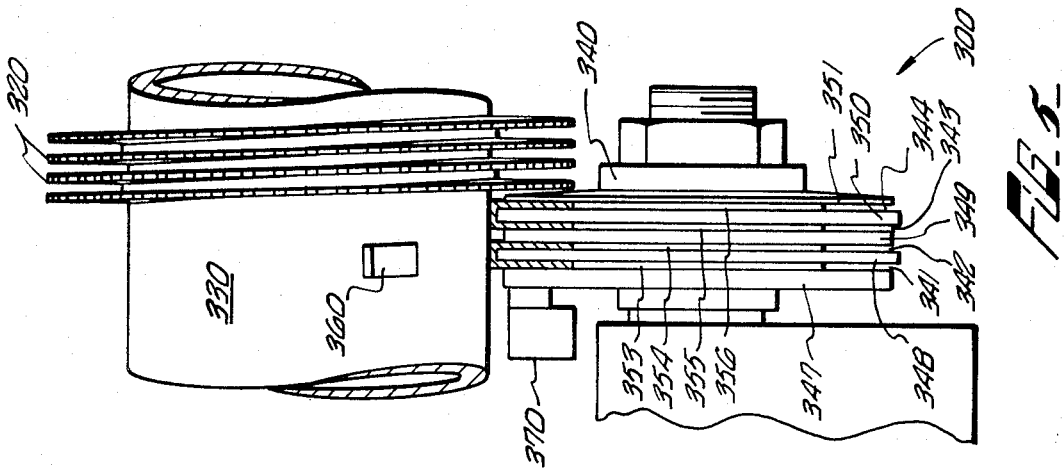
FIG. 5 is a plan view of a fourth embodiment of the present invention mounting and welding a pair of continuous channel fins to a tube.

DESCRIPTION OF THE PREFERRED EMBODIMENTS:

Referring now to the drawings, FIG. 1 shows an apparatus, generally indicated by arrow 10, for mounting and welding a length of fin stock 20 onto a length of tubing 30. The fin stock 20 is U-shaped in cross section and is conventionally described as a channel fin. A channel fin construction is described in U. S. Pat. No. 3,550,235 issued Dec. 29, 1970. The channel fin 20 is also segmented in the conventional manner to enable the fin stock 20 to be more easily wound onto the surface of the tubing 30. As more clearly shown in FIG. 2, the fin stock 20 is fed onto the outer surface of the tubing 30 while the tubing 30 is rotating. The tubing 30 also is moved longitudinally during rotation to enable the fin stock 20 to be helically wound thereon. This helical winding is shown in FIG. 1. The apparatus 10 for attaching the fin stock 20 to the tubing 30 comprises a weld wheel 40 which is rotatably mounted adjacent the tubing 30 at the point where the fin stock 20 is fed onto the peripheral surface thereof. The weld wheel 40 is driven by a motor 41 to rotate at the same tip speed as the tubing 30. The weld wheel 40 comprises a pair of annular pockets 43 and 45 which are adapted to receive the channel fin 20.

The weld wheel 40 includes three discs 47, 48, and 49 joined together in a side-by-side relationship. The disc 47 and 48 have smaller diameter annular portions 51 and 52 formed thereon and are mounted to be sandwiched between the discs to form the aforesaid pockets 43 and 45. The sides of the discs 47, 48, and 49 extend substantially to the base of the fin stock 20 to engage and adequately support the sides of the fin stock 20 as it is being fed onto the peripheral surface of the tubing 30. The center disc 48 extends entirely within the channel fin 20 and is adapted to engage the base portion of the fin 20 to apply a force thereon. Each of the discs 47, 48, and 49 are preferably made of berylium while the annular portions 51 and 52 can be made of steel for longer life under the forging force friction.

A first electrode 60 is provided having a surface for contacting the outer peripheral surface of the tubing 30. A second electrode 70 is provided having a surface for contacting the exterior disc 47 of the weld wheel 40. It should be noted that the fin stock 20, tubing 30, and weld wheel 40 are in a continuous metal-to-metal contact to establish an electrical current path between the two electrodes 60 and 70.

In operation, a high frequency current is applied through this path as the fin stock 20 is being fed onto the periphery of the tube 30. This current functions to melt the root of the fin stock 20 and the surface of the tubing 30 immediately prior to their mutual engagement point. As the molten portions of the fin stock 20 and tube 30 are united, the center disc 48 and the annular portions 51 and 52 apply a forging force to the fin stock 20 to create a fused bond therebetween. As previously pointed out, the lateral support given by the weld wheel 40, reduces the lateral movement or wiggling of the fin stock 20 as it is being attached to the tubing 30. This reduction of wiggling creates a much stronger weld between the fin stock 20 and the tubing 30 that was not heretofore possible.

Figure 3:
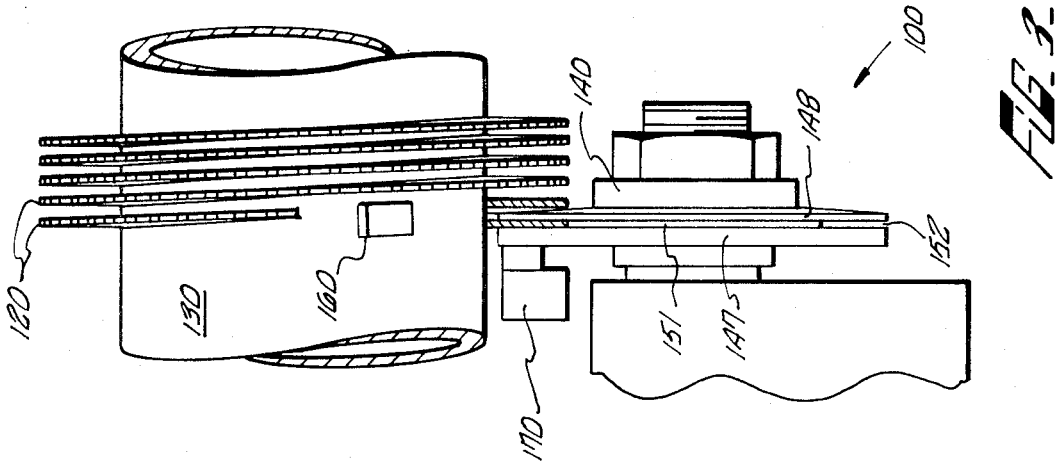
FIG. 3 is a plan view of a second embodiment of the present invention mounting and welding a segmented I-type fin to a tube.

FIG. 3 illustrates a second embodiment of the present invention wherein an apparatus 100 is utilized to mount and attach a segmented I-type fin 120 onto a length of tubing 130. In this second embodiment, a weld wheel 140 is rotatably mounted adjacent to the tubing 130 and comprises a pair of discs 147 and 148 having a smaller diameter segment 151 sandwiched therebetween to form a pocket 152 for receiving the fin stock 120. As in the previous embodiment, the discs 147 and 148 extend substantially to the base of the fin stock 120 to engage and provide adequate support to the sides thereof. The base of the pocket 152 functions to engage the tip of the fin 120 for applying a forging force thereto. First and second electrodes 160 and 170 are provided to respectively contact the peripheral surface of the tube 130 and the exterior disc 147 of the weld wheel 140. As in the previous embodiment, the fin stock 120, tubing 130, and weld wheel 140 are in continuous metal-to-metal contact to establish an electrical current path between the two electrodes 160 and 170. Similarly, a high frequency current is applied via the electrodes 160 and 170 through the current path to melt the root of the I-type fin stock 120 and the surface of the tubing 130 immediately prior to their mutual engagement point. As the fin stock 120 and tubing 130 are united, the base of the pocket 152 applies a force to the fin stock 120 to create a fused bond therebetween.

Figure 4:
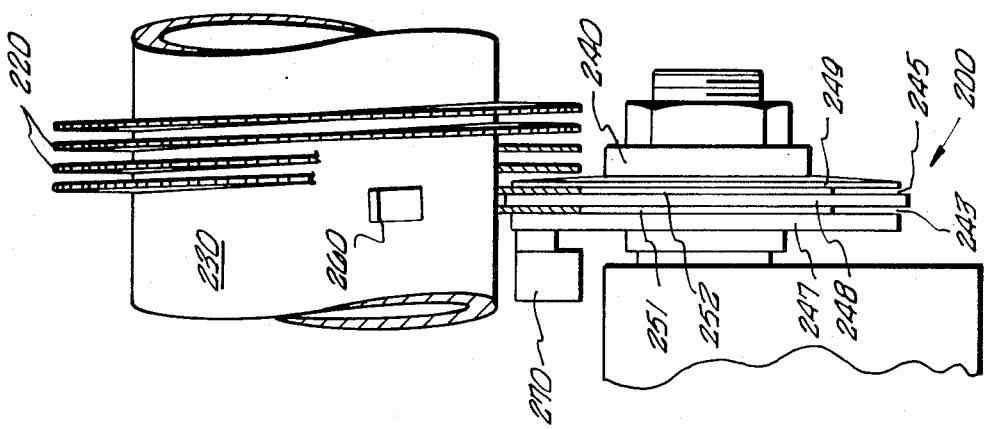
FIG. 4 is a plan view of a third embodiment of the present invention mounting and welding a pair of continuous I-type fins to a tube.

FIG. 4 illustrates a third embodiment of the invention in which the apparatus 200 is utilized to attach a pair of continuous I-type fins 220 onto the peripheral surface of a tube 230 simultaneously. The weld wheel 240 is similar to that shown in the first embodiment and includes two pockets 243 and 245 formed by positioning three discs 247, 248, and 249 in a side-by-side relationship having a pair of smaller diameter steel washers 251 and 252 sandwiched therebetween. A pair of electrodes 260 and 270 are positioned to respectively contact the tube 230 and the wheel 247 of the weld wheel 240. The disc 247, 248, and 249 extend substantially to the bases of the respective fins 220 for lateral support. The operation for this embodiment is similar to the previous embodiments. The only difference is that two continuous i-type fins are attached simultaneously thereby doubling the longitudinal speed of the tubing for any given rotational speed.

FIG. 5 shows a fourth embodiment of the invention in which the apparatus 300 is utilized to attach a pair of continuous channel fins 320 onto the peripheral surface of a tube 330 simultaneously. The electrode structure 360 and 370 is similar to that of the previous embodiments. The novel structure in this embodiment lies in the weld wheel 340 which comprises five outer discs 347, 348, 349, 350, and 351. Four smaller diameter steel spacer discs 353, 354, 355, and 356 are sandwiched therebetween. The pockets 341, 342, 343, and 344 formed therein function to receive the pair of channel fins 320 to laterally support the fins 320. The bases of the pockets function to apply a forging force to the fins 320 to create a fused bond between fins 320 and the registering tube surface 330. The five outer discs are preferably made of berylium while the spacer discs are preferably made of steel.

As can be seen, the lateral support provided by the weld wheel gives more than adequate support to the fin stock to substantially reduce the lateral movement of the fin stock as it is being fed onto the surface of the fin. As a result, a better weld is achieved.

Moreover, by contacting the weld wheel instead of a prior relatively unsupported fin, the electrode can be made of copper. This is because the lateral movement of the weld wheel is much less than the prior fins thereby enabling a metal electrode of less conductance to be used instead of the prior silver electrodes.

It should be noted that various modifications can be made to the apparatus while still remaining within the purview of the following claims. For example, the fin receiving pockets in the weld wheel can be formed within an integral wheel or the weld wheel can be formed from various plates or discs.

What is claimed is:

1. Apparatus for mounting and welding a length of fin stock onto the surface of a length of tubing comprising:
    means for feeding the fin stock onto the tubing;
    a first electrode adapted to contact the tubing;
    a source of high frequency potential connected to the first electrode;
    a second electrode connected to the source of high frequency potential; and
    a force applying weld wheel means for simultaneously bending and welding the fin stock to the tubing surface including a first metallic disc connected to the source of high frequency potential through a sliding contact with the second electrode adjacent the weld point and adapted to contact one side of the fin stock adjacent its base to both guide the fin stock and provide an electrical contact with the fin stock to conduct a weld current, a metallic pressure roller positioned adjacent the first disc and adapted to contact the top edge of the fin stock to exert a force against the fin stock to bend the fin stock about the tube surface and to assist in creating the fused bond with the tubing surface, and a second metallic disc positioned adjacent the metallic pressure roller and adapted to guidingly contact another side of the fin stock.

2. The invention of claim 1 wherein the second metallic disc is thinner than the first metallic disc, whereby the fin stock can be helically wound closer together without touching the second metallic disc than if it was the same thickness as the first metallic disc.

3. The invention of claim 1 wherein the first and second metallic discs are berylium and the pressure roller is steel and a copper electrode connects the first metallic disc with the source of high frequency potential.

4. The invention of claim 1 wherein the only current applied to the fin stock and tube is through the first metallic disc.

5. The invention of claim 2 wherein the second metallic disc is concave towards the first metallic disc.

6. The invention of claim 2 wherein a third metallic disc and a second metallic pressure roller are positioned between the first and second metallic discs to form a pair of annular pockets for receiving the fins of the fin stock.

7. The invention of claim 6 wherein the third metallic disc engages the base portion of the fin stock during a welding operation.

8. The invention of claim 7 wherein the third metallic disc has a larger diameter than the first and second metallic discs.

9. The invention of claim 8 wherein fourth and fifth metallic discs and third and fourth metallic pressure rollers are positioned between the third and second metallic discs to form an additional pair of annular pockets for receiving the fins of the fin stock.

10. The invention of claim 9 wherein the fifth metallic disc has the same diameter as the third metallic disc.

11. The invention of claim 10 wherein the metallic discs are berylium and the metallic pressure rollers are steel and a copper electrode electrically connects the first metallic disc with the source of high frequency potential.

\* \* \* \* \*